(12) United States Patent  (10) Patent No.: US 8,803,696 B1
Dunyan  (45) Date of Patent: Aug. 12, 2014

(54) CARBON MONOXIDE DETECTOR SAFETY SYSTEMS

(76) Inventor: Joseph W. Dunyan, King of Prussia, PA (US)

( * ) Notice: Subject to any disclaimer, the term of this patent is extended or adjusted under 35 U.S.C. 154(b) by 404 days.

(21) Appl. No.: 13/405,640

(22) Filed: Feb. 27, 2012

Related U.S. Application Data

(60) Provisional application No. 61/447,775, filed on Mar. 1, 2011.

(51) Int. Cl.
*G08B 17/10* (2006.01)
*B60R 25/10* (2013.01)
*F24F 7/06* (2006.01)

(52) U.S. Cl.
USPC ....... 340/632; 340/426.24; 340/438; 454/343

(58) Field of Classification Search
None
See application file for complete search history.

(56) References Cited

U.S. PATENT DOCUMENTS

| 3,502,887 | A | | 3/1970 | Erickson et al. |
| 6,110,038 | A | * | 8/2000 | Stern .............................. 454/343 |
| 6,339,379 | B1 | | 1/2002 | Argus et al. |
| 6,448,888 | B1 | * | 9/2002 | Horner et al. .............. 340/425.5 |
| 7,515,058 | B2 | | 4/2009 | Normand |
| 2005/0212681 | A1 | * | 9/2005 | Dzurko et al. ................ 340/632 |
| 2009/0124189 | A1 | * | 5/2009 | Barber .......................... 454/258 |
| 2010/0105311 | A1 | * | 4/2010 | Meneely, Jr. ................. 454/239 |
| 2010/0225493 | A1 | * | 9/2010 | Zishaan ........................ 340/627 |
| 2010/0253491 | A1 | * | 10/2010 | Grossman ................ 340/426.11 |

* cited by examiner

*Primary Examiner* — George Bugg
*Assistant Examiner* — Renee Dorsey
(74) *Attorney, Agent, or Firm* — RG Patent Consulting, LLC; Rachel Gilboy

(57) ABSTRACT

A carbon monoxide detector safety system comprising: a carbon-monoxide sensing and transmitting device; at least one door-opener receiver; and an onboard receiver connected to a wiring assembly of a vehicle; wherein said carbon monoxide detector safety system is useful to help prevent poisoning caused by carbon-monoxide accumulating within an enclosed space such as a garage. The carbon monoxide detector safety system acting in the capacity of an active carbon monoxide alarm system.

1 Claim, 5 Drawing Sheets

Down Position

Up Position

CARBON MONOXIDE DETECTOR SAFETY SYSTEMS

CROSS-REFERENCE TO RELATED APPLICATION

The present application is related to and claims priority from prior provisional application Ser. No. 61/447,775, filed Mar. 1, 2011 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

The following includes information that may be useful in understanding the present invention(s). It is not an admission that any of the information provided herein is prior art, or material, to the presently described or claimed inventions, or that any publication or document that is specifically or implicitly referenced is prior art.

BACKGROUND OF THE INVENTION

1. Field of the Invention

The present invention relates generally to the field of gas detectors and more specifically relates to a carbon monoxide gas detector system for use with automotive vehicles and garage doors.

2. Description of the Related Art

Individuals in modern society often drive to work and for recreational purposes. In addition to the problem of air pollution caused by automotive vehicles, another potentially deadly aspect about the fumes produced by engines is carbon monoxide. Carbon monoxide poisoning occurs after inhalation of carbon monoxide (CO) passes a low threshold. Carbon monoxide is a toxic gas, but being colorless, odorless, tasteless, and non-irritating, it is often very difficult for people to detect with only human senses.

Carbon monoxide is a by-product of incomplete combustion of organic matter with insufficient oxygen supply to enable complete oxidation to carbon dioxide ($CO_2$). CO is often produced in domestic or industrial settings by older motor vehicles and other gasoline-powered tools, heaters, and cooking equipment. Exposures at 100 ppm or greater can be dangerous to human health. Exposures at sufficiently high levels can lead to significant toxicity of the central nervous system and heart, and in certain instances can even lead to death. Following acute poisoning, long-term sequelae often occur. Chronic exposure to low levels of carbon monoxide can lead to depression, confusion, and memory loss. Carbon monoxide mainly causes adverse effects in humans by combining with hemoglobin to form carboxyhemoglobin (HbCO) in the blood. This prevents oxygen from binding with hemoglobin, reducing the oxygen-carrying capacity of the blood, leading to hypoxia. The presence of CO may cause danger to individuals in open air conditions and be deadly in closed spaces.

Many individuals in modern society live in dwellings with attached garages. This may pose dangers to the health of the occupants such as the CO poisoning as mentioned above. Motor vehicles are the primary cause of all unintentional carbon monoxide deaths, with deaths occurring in moving as well as stationary vehicles. According to the National Highway Traffic Safety Administration (NHTSA) more than one-third of deaths from carbon monoxide poisoning by motor vehicles occur in winter months, often in garages. 353 persons died as a result of accidental carbon monoxide poisoning from motor vehicle exhaust gases in 2007 alone. Accidental carbon monoxide deaths typically occur from motor vehicles left idling in enclosed spaces or in areas without adequate ventilation, such as the aforementioned garages. A need exists to provide a warning and active safety measure to prevent these conditions from leading to the injury and death of dwelling occupants.

Various attempts have been made to solve problems found in the carbon monoxide detector art. Among these are found in: U.S. Pat. No. 6,339,379 to Michael A. Argus et al; U.S. Pat. No. 3,502,887 to Paul N. Erickson et al; and U.S. Pub. No. 2007/0290870 to William Normand. This prior art is representative of carbon monoxide detectors. None of the above inventions and patents, taken either singly or in combination, is seen to describe the invention as claimed.

Ideally, a carbon monoxide detector safety system should be active (not passive), user-friendly and promote safety, yet would operate reliably and be manufactured at a modest expense. Thus, a need exists for a reliable carbon monoxide detector safety system to avoid the above-mentioned problems.

BRIEF SUMMARY OF THE INVENTION

In view of the foregoing disadvantages inherent in the known active alarm art, the present invention provides a novel carbon monoxide detector safety system. The general purpose of the present invention, which will be described subsequently in greater detail is to provide safety for individuals by serving to prevent carbon monoxide poisoning. Carbon monoxide detector safety system, the 'Dunyan Alert' is an active system that provides multiple responses and alerts motorists and others to safeguard them from the dangers of accidental carbon monoxide poisoning.

A carbon monoxide detector safety system is disclosed herein, in a preferred embodiment comprising: a carbon-monoxide sensing and transmitting device; at least one door-opener receiver; and an onboard receiver connected to a wiring assembly of a vehicle. The carbon-monoxide sensing and transmitting device further comprises a test button in certain embodiments. The carbon-monoxide sensing and transmitting device may be connected to an AC power source and a DC backup battery. Further, the carbon-monoxide sensing and transmitting device senses an amount of carbon-monoxide present in an enclosed area and measures the amount of carbon-monoxide present in PPM. Carbon monoxide detector safety system is useful to help prevent poisoning caused by the carbon-monoxide as the active carbon monoxide alarm system.

The door-opener receiver, the onboard receiver and the carbon-monoxide sensing and transmitting device are in remote wireless communication with each other forming the active carbon monoxide alarm system. The active carbon monoxide alarm system uses radio frequency in preferred embodiments to provide the communication means; however other forms of communication may be used in alternate embodiments.

The carbon-monoxide sensing and transmitting device transmits a signal to the door-opener receiver and the onboard receiver when the amount of carbon-monoxide present in PPM within the enclosed area reaches a pre-determined threshold. The signal activates the door-opener receiver to open at least one garage door and/or deactivate the vehicle such that the vehicle is no longer producing the carbon-monoxide. Further, the opening of the garage door(s) allows the carbon-monoxide to be diluted and dispersed. Further, the onboard receiver is able to activate power windows to open the power windows on the vehicle. Also the onboard receiver is able to control an ignition control circuit on the vehicle.

Carbon-monoxide sensing and transmitting device uses electrochemical cell technology in preferred embodiments providing a highly accurate and linear output related to a measured concentration of the carbon monoxide. The electrochemical cell technology is designed to produce a current that is precisely related to the PPA of the carbon monoxide as sensed.

The active carbon monoxide alarm system may further comprise an audible alarm. The audible alarm may comprise an intermittent beeping sound or other such suitable sound indicative that an emergency condition may exist. The intermittent beeping sound comprises a higher frequency as measured by the PPM as the carbon monoxide increases. Additionally, in certain embodiments the active carbon monoxide alarm system comprises a visual alert such as a light. The visual alert may comprise a digital readout recording a present level and a peak level of the carbon-monoxide recorded over a set time period. Further, the carbon-monoxide sensing and transmitting device is to be tested at pre-set intervals using an external source of calibrated test gas to verify the carbon-monoxide sensing and transmitting device is in a working condition. In this way the present invention may be suitably maintained and checked periodically for increased safety of the user.

A kit is also described herein including installing a door-opener receiver, an onboard receiver and a carbon-monoxide sensing and transmitting device.

A method of using a carbon monoxide detector safety system is also disclosed herein comprising the steps of: installing a door-opener receiver, an onboard receiver and a carbon-monoxide sensing and transmitting device in communication to provide an active carbon monoxide alarm system; measuring a relative PPM of an enclosed area to detect a presence of carbon monoxide; activating a door-opener receiver and an onboard receiver via the carbon-monoxide sensing and transmitting device if a threshold of the carbon monoxide is reached causing a garage door to be opened and a motor of a vehicle to be stopped; and testing the active carbon monoxide alarm system at a pre-determined interval.

The present invention holds significant improvements and serves as a carbon monoxide detector safety system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, carbon monoxide detector safety system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to an active alarm device and more particularly to a carbon monoxide detector safety as used to improve the safety of protected individuals.

Generally speaking, the Dunyan Alert system comprises at least one carbon monoxide sensor, plugged into a standard electrical outlet, that works in conjunction with (a pair of) garage door opener remotes to open a garage door should the PPM (Parts Per Million) of carbon monoxide reach dangerous levels (dangerous to human health.) The device may be (OEM) or as an aftermarket product used on vehicles. This unit may operate on DC power and is preferably connected to vehicular power, via the power distribution panel, and mounted in the passenger compartment, at a location beneath the dashboard. The other components may be powered via AC power.

In certain embodiments, the Dunyan Alert may be connected by electrical wiring to the ignition control circuit and to the switches that control window operation on vehicles that are equipped with electrically operated windows. Another component of the Dunyan Alert system incorporates a radio frequency (RF) transmitter that generates and transmits a signal that is recognized by a receiving unit on an electrically operated, remotely controlled, garage door.

Carbon monoxide may be monitored by an electrochemical sensor which, whenever a dangerous level of carbon monoxide is detected, generates a signal that activates the RF transmitter. The transmitter then emits a signal that activates the garage door opener, initiating the door to be opened. Coincident with this action, a "low" signal (ground) may be applied to the ignition circuitry to disable the ignition system and stop the engine. A voltage level may also be applied to the "down" contacts of the window control switches, causing the windows to be lowered. All of these actions rapidly dispel carbon monoxide and safeguard the motorist and other individuals who may reside above or below a garage against the potentially fatal effects of carbon monoxide. The Dunyan Alert is designed to be instrumental in reducing the number of carbon monoxide fatalities.

Figure 1:
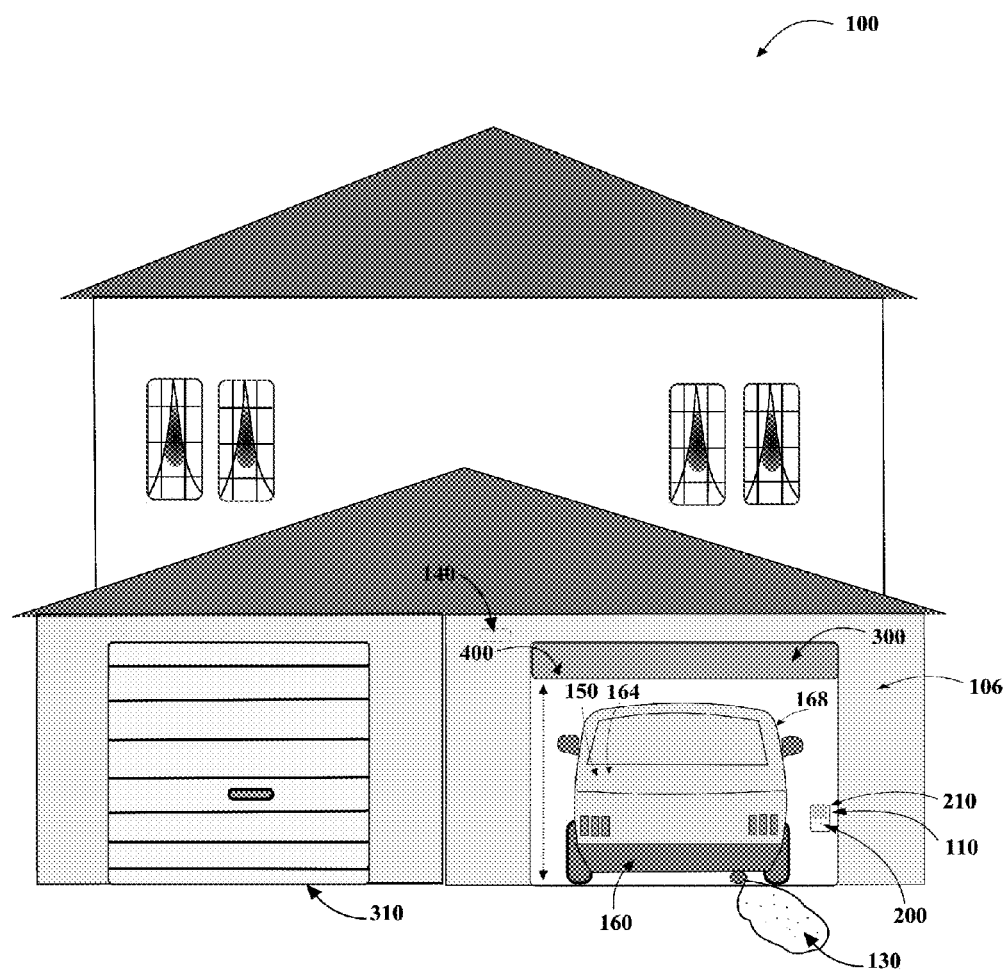
FIG. 1 shows a perspective view illustrating a carbon monoxide detector safety system in an in-use condition according to an embodiment of the present invention.

Referring to the drawings by numerals of reference there is shown in FIG. 1, a perspective view illustrating carbon monoxide detector safety system 100 in in-use condition 106 according to an embodiment of the present invention.

Carbon monoxide detector safety system 100 is useful to help prevent poisoning caused by carbon-monoxide 130 as active carbon monoxide alarm system 102. Carbon monoxide detector safety system 100 preferably comprises carbon-monoxide sensing and transmitting device 110; at least one door-opener receiver 140; and onboard receiver 150 connected to wiring assembly 164 of vehicle 160. Those with ordinary skill in the art will now appreciate that upon reading this specification and by their understanding the art of engine/vehicle wiring as described herein, methods of engine deactivation means will be understood by those knowledgeable in such art. Door-opener receiver 140, onboard receiver 150 and carbon-monoxide sensing and transmitting device 140 are preferably in communication with each other forming active carbon monoxide alarm system 102.

Carbon-monoxide sensing and transmitting device 110 is connected to power source 120. Carbon-monoxide sensing and transmitting device 110 senses an amount of carbon-monoxide 130 present in an enclosed area and measures the amount of carbon-monoxide 130 present in PPM.

Carbon-monoxide sensing and transmitting device 110 transmits a signal to door-opener receiver 140 and onboard receiver 150 when the amount of carbon-monoxide 130 present in PPM within the enclosed area reaches a pre-determined threshold. The signal activates door-opener receiver 140 to open at least one garage door 190 and deactivates vehicle 160 such that vehicle 160 is no longer producing carbon-monoxide 130 and open garage door(s) 190 allows the carbon-monoxide to be diluted and dispersed. Onboard receiver 150 is preferably able to activate power windows 168 of vehicle 160 to open power windows 168. Onboard receiver 150 is also able to control an ignition control circuit. The present invention may or may not be used in conjunction with the vehicle control unit. A directional arrow is shown to indicate directions of travel of garage door(s) 300 (up to an open position when PPA of carbon-monoxide 130 registers high.)

Figure 2:
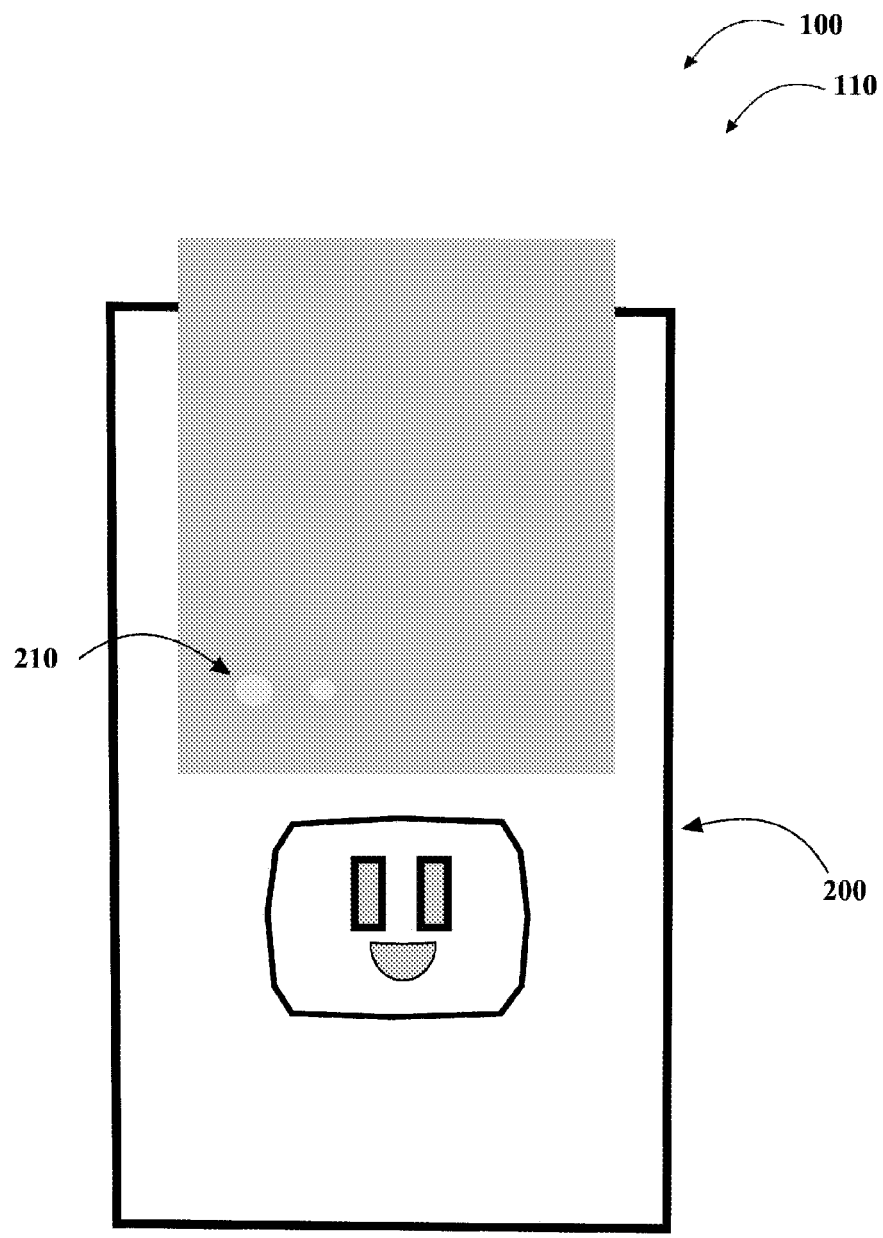
FIG. 2 is a perspective view illustrating a carbon monoxide detector device as connected to an AC outlet, in communication, the carbon monoxide detector with the carbon monoxide detector safety system according to an embodiment of the present invention of FIG. 1.

Referring now to FIG. 2, a perspective view illustrating carbon monoxide detector device 110 as connected to AC outlet 200; carbon monoxide detector device 110 in communication with carbon monoxide detector safety system 100 according to an embodiment of the present invention of FIG. 1.

Carbon-monoxide sensing and transmitting device 110 preferably uses electrochemical cell technology having a highly accurate and linear output to concentration of carbon monoxide 130. The electrochemical cell technology is designed to produce a current that is precisely related to the PPA of carbon monoxide 130 sensed and to activate door opening/vehicle shutdown when a pre-determined threshold is reached. Activation is initiated by an electrical signal dispatched from carbon-monoxide sensing and transmitting device 110.

Active carbon monoxide alarm system 102 may comprise an audible and/or visual alert. The audible alert may be an audible alarm. The audible alarm may comprise an intermittent beeping sound or non-intermittent sound. In preferred embodiments the intermittent beeping sound comprises a higher frequency as measured PPM of carbon monoxide 130 increases. The visual alert may also comprise a light. The visual alert may further comprise at least one digital readout recording a present level and a peak level recorded over a time period. In this way the present invention may track relative PPA over a period of time.

Carbon-monoxide sensing and transmitting device 110 may also comprise test button 210. Carbon-monoxide sensing and transmitting device 110 is connected to an AC power source, as shown; however alternate embodiments may be powered via DC means. Carbon-monoxide sensing and transmitting device 110 may comprises a DC backup (batteries) in the event that the AC power source is not available for carbon-monoxide sensing and transmitting device 110, thus the present invention is able to maintain a working condition in events such as power failures. Carbon-monoxide sensing and transmitting device 110 is to be tested at pre-set intervals using an external source of calibrated test gas to verify carbon-monoxide sensing and transmitting device 110 is in a working condition.

Figure 3:
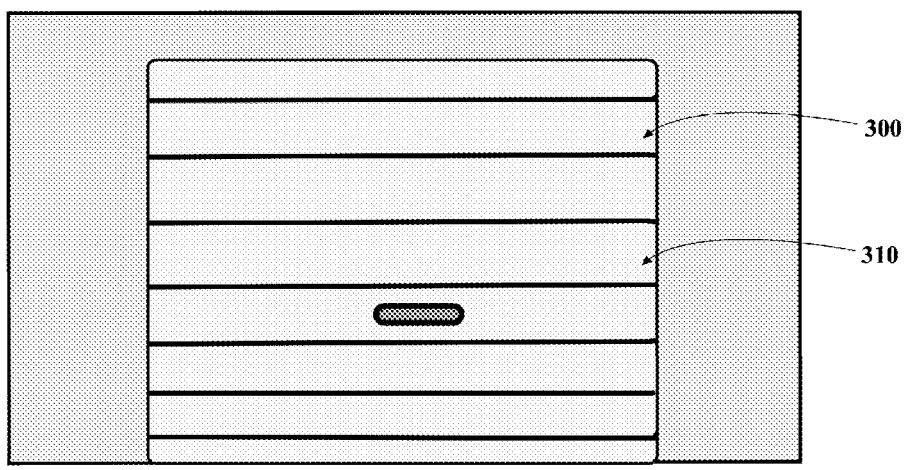
FIG. 3 is a perspective view illustrating a garage door in a lowered condition (closed) according to an embodiment of the present invention of FIG. 1.

Referring now to FIG. 3, a perspective view illustrating garage door 300 in a lowered condition (closed) 310 according to an embodiment of the present invention of FIG. 1.

Active carbon monoxide alarm system 102 preferably uses radio frequency (RF) due to the inexpensive nature of the components and their ready availability. Further, use of RF allows the present invention to be easily retro-fit to existing garage door opener systems. Door-opener receiver 140, onboard receiver 150, and carbon-monoxide sensing and transmitting device 110 are in remote wireless communication with each other forming active carbon monoxide alarm system 102.

Figure 4:
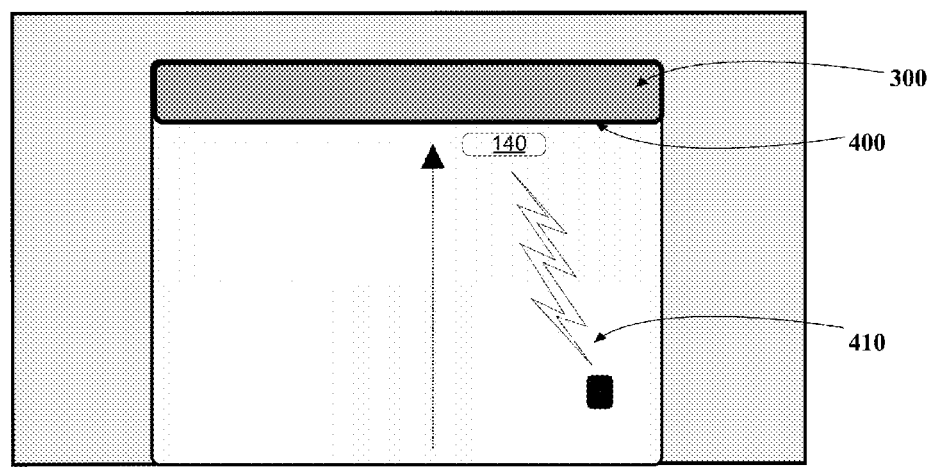
FIG. 4 is a perspective view illustrating the same garage door in a raised condition (opened) as activated by the carbon monoxide detector device according to an embodiment of the present invention of FIGS. 1 and 2.

Referring now to FIG. 4, a perspective view illustrating the same garage door 300 in a raised condition (opened) 400 as activated by carbon monoxide detector device 110 according to an embodiment of the present invention of FIGS. 1 and 2.

Signal 410 activates door-opener receiver 140 to open at least one garage door 300 and deactivates vehicle 160 such that vehicle 160 is no longer producing carbon-monoxide and garage door(s) 300 in raised condition (open) 400 preferably allows carbon-monoxide 130 to be diluted and dispersed, as also shown in FIG. 1.

Carbon monoxide detector safety system 100 may be sold as kit 440 comprising the following parts: at least one door-opener receiver 140, at least one onboard receiver 150 and at least one carbon-monoxide sensing and transmitting device 110; and at least one set of user instructions. Carbon monoxide detector safety system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Figure 5:
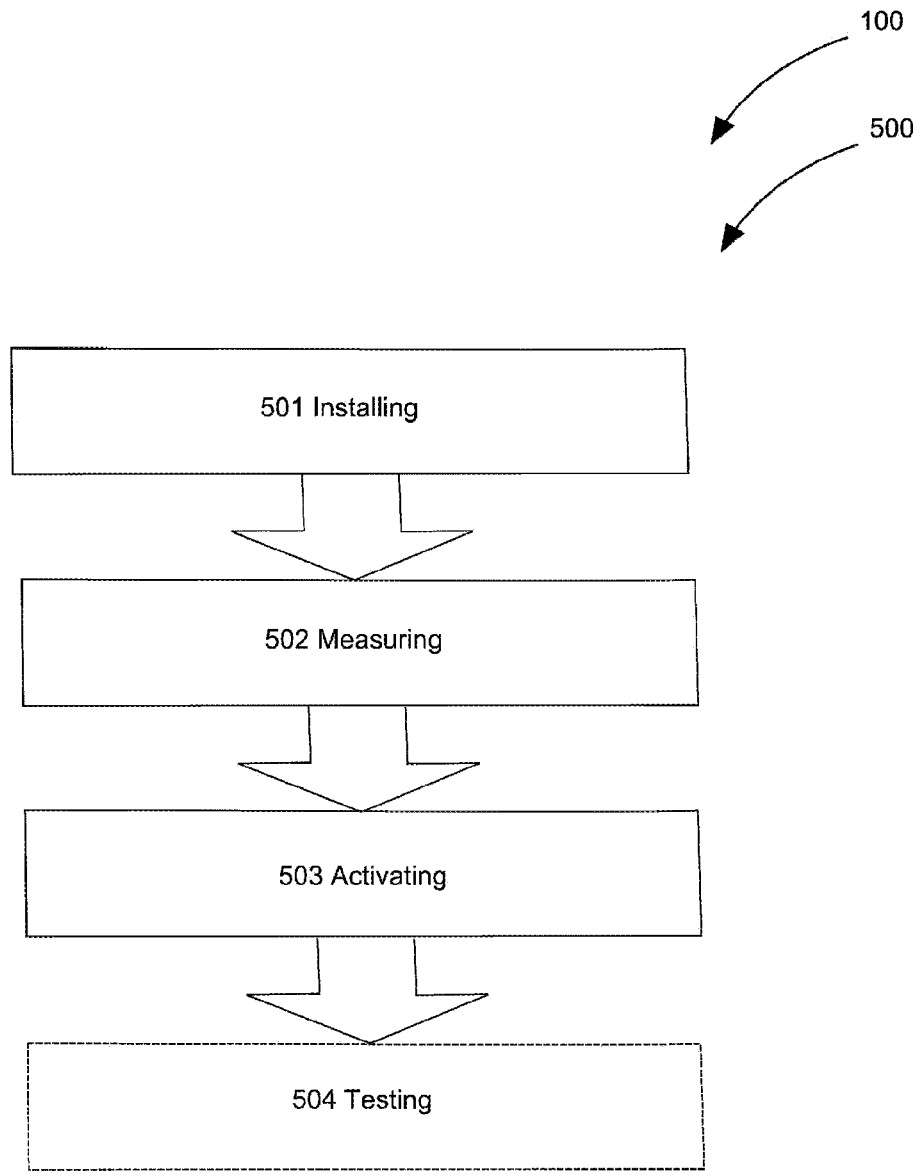
FIG. 5 is a flowchart illustrating a method of using the carbon monoxide detector safety system according to an embodiment of the present invention of FIGS. 1-4.

Referring now to FIG. 5, a flowchart illustrating a method of using (method of use 500) carbon monoxide detector safety system 100 according to an embodiment of the present invention of FIGS. 1-4.

A method of using (method of use 500) carbon monoxide detector safety system 100 preferably comprises the steps of: step one 501 installing door-opener receiver 140, onboard receiver 150 and carbon-monoxide sensing and transmitting device 110 in communication to provide active carbon monoxide alarm system 102; step two 502 measuring a relative PPM of an enclosed area to detect a presence of carbon monoxide 130; step three 503 activating door-opener receiver 140 and onboard receiver 150 via carbon-monoxide sensing and transmitting device 110 if a threshold of carbon monoxide 130 is reached causing garage door 300 to be opened and a motor of vehicle 160 to be stopped; and step four 504 testing active carbon monoxide alarm system 102 at a pre-determined interval.

It should be noted that step 504 is an optional step and may not be implemented in all cases. Optional steps of method 500 are illustrated using dotted lines in FIG. 5 so as to distinguish them from the other steps of method 500.

It should be noted that the steps described in the method of use can be carried out in many different orders according to user preference. The use of "step of" should not be interpreted as "step for", in the claims herein and is not intended to invoke the provisions of 35 U.S.C. §112, ¶ 6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A carbon monoxide detector safety system comprising:
    a carbon-monoxide sensing and transmitting device;
    at least one door-opener receiver; and
    an onboard receiver connected to a wiring assembly of a vehicle;
    wherein said carbon-monoxide sensing and transmitting device is connected to an AC power source and a DC backup battery;
    wherein said carbon-monoxide sensing and transmitting device senses an amount of carbon-monoxide present in an enclosed area and measures said amount of carbon-monoxide present in PPM;
    wherein said door-opener receiver, said onboard receiver and said carbon-monoxide sensing and transmitting device are in communication forming an active carbon monoxide alarm system;
    wherein said door-opener receiver, said onboard receiver and said carbon-monoxide sensing and transmitting device are in remote wireless said communication with each other forming said active carbon monoxide alarm system;
    wherein said active carbon monoxide alarm system uses radio frequency to provide said communication;
    wherein said carbon-monoxide sensing and transmitting device transmits a signal to said door-opener receiver and said onboard receiver when said amount of carbon-monoxide present in PPM within said enclosed area reaches a pre-determined threshold;
    wherein said signal activates said door-opener receiver to open at least one garage door and deactivates said vehicle such that said vehicle is no longer producing said carbon-monoxide and open said garage door(s) allows said carbon-monoxide to be diluted and dispersed;
    wherein said carbon-monoxide sensing and transmitting device uses electrochemical cell technology providing a highly accurate and linear output related to a measured concentration of said carbon monoxide;
    wherein said electrochemical cell technology is designed to produce a current that is precisely related to said PPA of said carbon monoxide as sensed;
    wherein said active carbon monoxide alarm system comprises an audible alarm;
    wherein said audible alarm comprises an intermittent beeping sound;
    wherein said intermittent beeping sound comprises a higher frequency as measured said PPM of said carbon monoxide increases;
    wherein said active carbon monoxide alarm system comprises a visual alert;
    wherein said visual alert comprises a light;
    wherein said visual alert comprises a digital readout recording a present level and a peak level of said carbon-monoxide recorded over a set time period;
    wherein said carbon-monoxide sensing and transmitting device further comprises a test button;
    wherein said carbon-monoxide sensing and transmitting device is to be tested at pre-set intervals using an external source of calibrated test gas to verify said carbon-monoxide sensing and transmitting device is in a working condition;
    wherein said onboard receiver is able to activate power windows to open said power windows on said vehicle; and
    wherein said onboard receiver is able to control an ignition control circuit on said vehicle.

\* \* \* \* \*